United States Patent
Beveridge et al.

(10) Patent No.: US 11,586,975 B2
(45) Date of Patent: *Feb. 21, 2023

(54) MACHINE LEARNING MODEL SCORE OBFUSCATION USING MULTIPLE CLASSIFIERS

(71) Applicant: Cylance Inc., Irvine, CA (US)

(72) Inventors: David N. Beveridge, Portland, OR (US); Hailey Buckingham, Vancouver, WA (US)

(73) Assignee: Cylance Inc., San Ramon, CA (US)

( * ) Notice: Subject to any disclaimer, the term of this patent is extended or adjusted under 35 U.S.C. 154(b) by 899 days.

This patent is subject to a terminal disclaimer.

(21) Appl. No.: 16/399,665

(22) Filed: Apr. 30, 2019

(65) Prior Publication Data

US 2020/0349461 A1 Nov. 5, 2020

(51) Int. Cl.
  *G06F 21/56* (2013.01)
  *G06F 21/14* (2013.01)
  *G06N 20/00* (2019.01)
  *G06N 5/048* (2023.01)

(52) U.S. Cl.
  CPC .......... *G06N 20/00* (2019.01); *G06F 21/562* (2013.01); *G06N 5/048* (2013.01); *G06F 2221/033* (2013.01)

(58) Field of Classification Search
  CPC ...... G06N 20/00; G06N 5/048; G06F 21/562; G06F 2221/033; G06F 21/56; G06F 21/14
  See application file for complete search history.

(56) References Cited

U.S. PATENT DOCUMENTS

| 8,489,689 B1* | 7/2013 | Sharma ............... G06Q 10/107 709/206 |
| 2015/0128263 A1 | 5/2015 | Raugas et al. |
| 2016/0224593 A1 | 8/2016 | Qiu et al. |
| 2019/0102700 A1* | 4/2019 | Babu ...................... G06N 5/025 |
| 2019/0286242 A1* | 9/2019 | Ionescu .................. G06F 17/18 |
| 2019/0370634 A1* | 12/2019 | Ferreira Moreno .. G06F 9/5072 |
| 2022/0229983 A1 | 7/2022 | Zohrevand et al. |

OTHER PUBLICATIONS

Notice of Allowance dated Oct. 5, 2022 issued on U.S. Appl. No. 16/399,735 (10 pages).
Office Action dated May 23, 2022 issued on U.S. Appl. No. 16/399,735 (16 pages).

* cited by examiner

*Primary Examiner* — Jayesh M Jhaveri
(74) *Attorney, Agent, or Firm* — Jones Day

(57) ABSTRACT

An artefact is received. Thereafter, features are extracted from the artefact and a vector is populated. Later, one of a plurality of available classification models is selected. The classification models use different scoring paradigms while providing the same or substantially similar classifications. The vector is input into the selected classification model to generate a score. The score is later provided to a consuming application or process. The classification model can characterize the artefact as being malicious or benign to access, execute, or continue to execute so that appropriate remedial action can be taken or initiated by the consuming application or process. Related apparatus, systems, techniques and articles are also described.

20 Claims, 3 Drawing Sheets

MACHINE LEARNING MODEL SCORE OBFUSCATION USING MULTIPLE CLASSIFIERS

TECHNICAL FIELD

The subject matter described herein is directed to techniques for obfuscating the output of machine learning models using multiple classifiers with different scoring paradigms.

BACKGROUND

Machine learning and other types of artificial intelligence models are being increasingly deployed across different applications and industries. Such models provide classifications which can be based, for example, on historical data with known outcomes or features. The classifications provided by such models (i.e., the model outputs, etc.) can take various forms including a Boolean output (e.g., good/bad, etc.), a numerical score (e.g., 0.00 to 1, 1 to 100, etc.), or a grouping (e.g., automobile, pedestrian, crosswalk, etc.). With some software implementations, the outputs of such models can be intercepted even when part of a more larger workflow. Such interception can allow a malicious actor to manipulate the classification by such models by repeatedly providing sample input data until a desired classification is received (even if such classification is not ultimately accurate).

SUMMARY

In one aspect, an artefact is received. Thereafter, features are extracted from the artefact and a vector is populated. Later, one of a plurality of available classification models is selected. The classification models use different scoring paradigms while providing the same or substantially similar classifications. The vector is input into the selected classification model to generate a score. The score is later provided to a consuming application or process. The classification model can characterize the artefact as being malicious or benign to access, execute, or continue to execute so that appropriate remedial action can be taken or initiated by the consuming application or process.

The classification model can be selected using different mechanisms including, a random selection algorithm, a load balancing algorithm (which can take into account utilized and/or available computing resources, a round robin algorithm and the like.

The features in the vector can be reduced prior to their being input into the classification model. Feature/dimension reduction techniques that can be utilized include random projection matrices, principal component analysis, and the like.

The classification model can be a machine learning model trained using a training data set and providing a continuous scale output. Example machine learning models include, without limitation, logistic regression models, neural networks (including concurrent neural networks, recurrent neural networks, generative adversarial networks, etc.), support vector machines, random forests, Bayesian models, and more.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for obfuscating the output of an AI/machine learning model. Such obfuscation is particularly important for applications such as malware detection as it prevents a malicious actor from iteratively modifying a malicious file or code until such time that the model classifies such file or code as being safe to execute or otherwise access.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to techniques for obfuscating an output of a software-based classifier by using different scoring models which have different scoring paradigms but which provide the same or similar ultimate classification. The classifier in this regard can be an AI/machine learning model that outputs at least one value that characterizes the input to such model. While the current subject matter provides examples relating to models used for detection of malicious software ("malware"), it will be appreciated that the current subject matter can, unless otherwise specified, apply to other applications/workflows utilizing a model including, for example, autonomous vehicle navigation systems, image analysis systems, biometric security systems, video game cheat circumvention systems, and the like.

In some cases, the output of a classification model can be intercepted and exploited by a malicious actor as part of an adversarial attack. For example, data exchanged between a client and a remote server executing the classification model can be accessed such that small changes can be made to the data (e.g., file, code, artifact, etc.) input into the classification model until a desired outcome (from the point of view of the malicious actor) is obtained. For example, a malicious actor either automatically or through manual modifications can make small changes to a file encapsulating malicious code until such time that classification model determines that such file is safe to execute or otherwise access.

Figure 1:
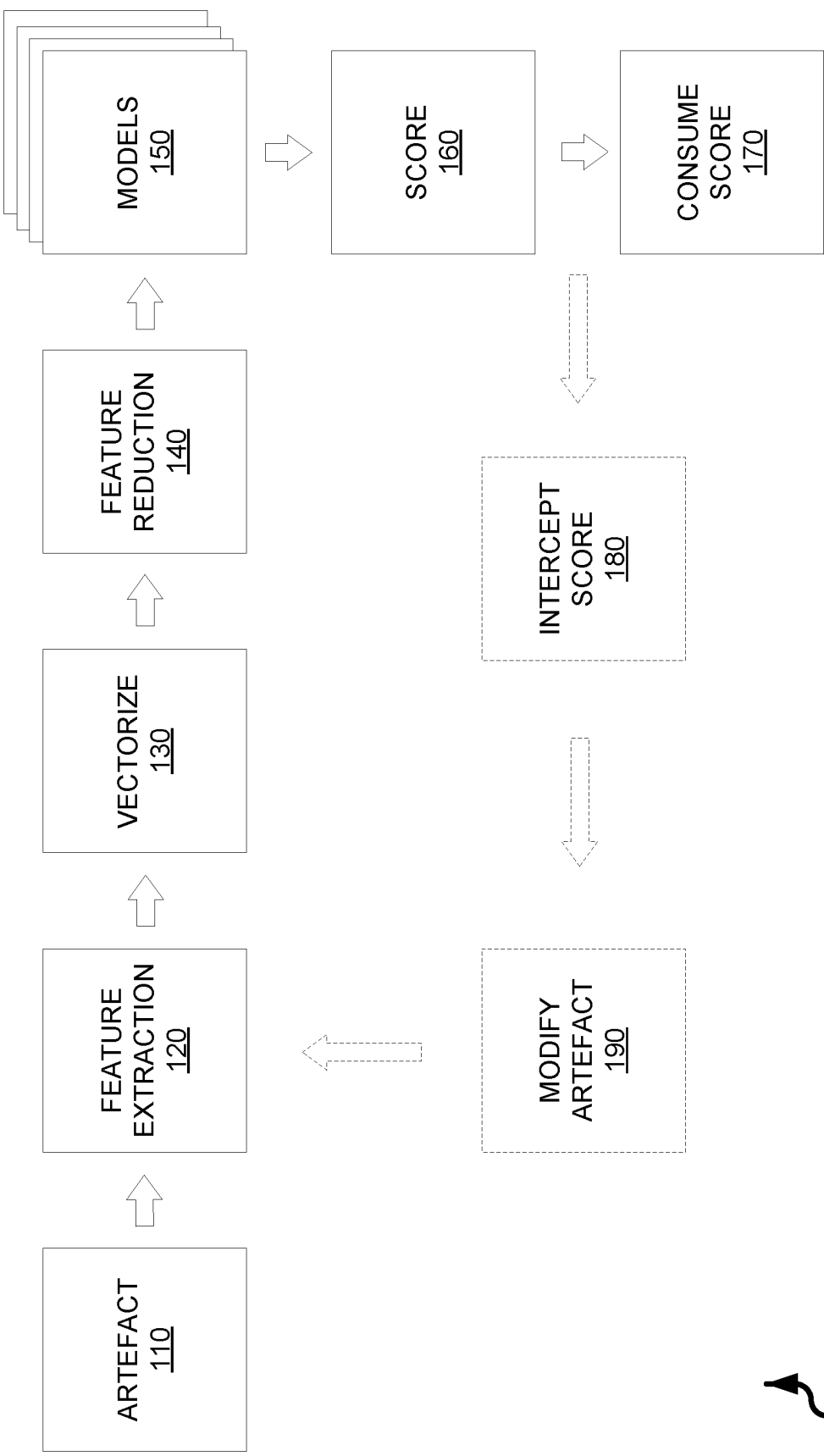
FIG. 1 is a process flow diagram illustrating a first computer-implemented workflow for obfuscating a classification of an artefact by using a plurality of classification models using different scoring paradigms.

FIG. 1 is a process flow diagram 100 illustrating a sample computer-implemented workflow for use with the current techniques for score obfuscation. Initially, an artefact 110 can be received (e.g., accessed, loaded, received from a remote computing system, etc.). The artefact 110 can be a file, a portion of a file, metadata characterizing a file, and/or source code. This artefact 110 can be parsed or otherwise processed by an observer. In particular, the observer can extract 120 features (sometimes referred to as attributes or observations) from the artefact and vectorize 130 such features. Further, depending on the complexity and/or quantity of features within a vector, a feature reduction operation 140 can be performed on the vector which reduces the amount of dimensions of such vector. The feature reduction operation 140 can utilize various techniques including, but not limited to, principal component analysis and random projection matrices to reduce the number of extracted features within the vector while, at the same time, remaining useful (i.e., for classification purposes, etc.) when input into one of a plurality of classification models 150 (sometimes referred to as an ensemble of classification models 150).

Each of the classification models 150 can provide, for example, scores across a range (as opposed to a Boolean output) and such ranges may differ for each type of classification model 150. However, with the current subject matter, the classification models 150 are trained or otherwise configured to provide the same or a substantially similar classification of the artefact 110 despite outputting scores with different outputs.

The classification model 150 utilized at any given time can, in some cases, be chosen using a random selection algorithm. Such an arrangement is advantageous (as further described below) in that it makes it more difficult to reverse engineer or otherwise manipulate the classification models 150. In other arrangements, the utilized classification model 150 can be selected using a round robin arrangement; however, such an arrangement can be more easily reverse engineered by a malicious actor. In still other arrangements, the classification model 150 can be selected based on a load balancing algorithm which takes into account which resources are being utilized. Such an arrangement can, for example, be used when there are distributed or remote computing systems available to execute the classification model 150.

The classification models 150 can take various forms including, without limitation, a logistic regression model, a neural network (including concurrent neural networks, recurrent neural networks, generative adversarial networks, etc.), a support vector machine, a random forest, a Bayesian model, and the like. The output of the classification models 150 can be a score 160. As used herein, unless otherwise specified, the score can be a numeric value, a classification type or cluster, or other alphanumeric output which, in turn, can be used by a consuming process 170 or application to take some subsequent action. For malware applications, the score can be used to determine whether or not to access, execute, continue to execute, quarantine, or take some other remedial action which would prevent a software and/or computing system from being infected or otherwise infiltrated by malicious code or other information encapsulated within the artefact 110.

FIG. 1 further illustrates the interception of the score 180. Such interception can occur, for example, when the API of the consuming application is known; by dumping DLL/SO exports with link, nm, obj dump; by using various reverse-compilers; by observing stack/heap/registers during execution for function-calling behavior, and the like. Other API (i.e., function)-discovering techniques can also be used.

In an arrangement in which the output of the model 150 can be readily ascertained (e.g., a single model 150 arrangement without score obfuscation), the score 160 can be used by a malicious actor to modify the artefact 190 and repeat the process until such time that a desired score 160 by the corresponding model 150. For example, the modified artefact 190 can encapsulate malicious script and small changes to the artefact 110 could result in the corresponding classification model 150 classifying such modified artefact 190 as being benign.

Modifications to an artefact 150 can be done in such a way as to maintain the original character or nature of the artefact 150. In the example of an actor attempting to modify a malicious file (malware), any modifications must be such that the malware still operates as intended. Such modifications can be made by (for instance) adding to, removing from, or altering un-used portions of the malicious file. As these portions of the file are unused, they have no effect on the realized behavior of the file, but may result in a different score 160 from the model 150. Alternatively or additionally, used sections of the artefact 150 can also be modified, so long as the final function of the malware is left intact.

Whether manually, or in an automated system, the actor or system will typically make many small changes, and get new scores 160 from the model 150. Any change that moved the score 160 in the desired direction (i.e. in the malware example, moving the score closer to a value that is interpreted as benign) is maintained, while other changes are discarded. Such an iterative process can be repeated until the cumulative changes to the artefact 110 result in a cumulative change in the score 150 which accomplishes the desired effect. The obfuscation techniques provided herein can interrupt this cycle of iterative improvements by masking the true effect of each change to an artefact 110 with a false or misleading change in the score 160 which is determined by the obfuscation techniques herein.

Figure 2:
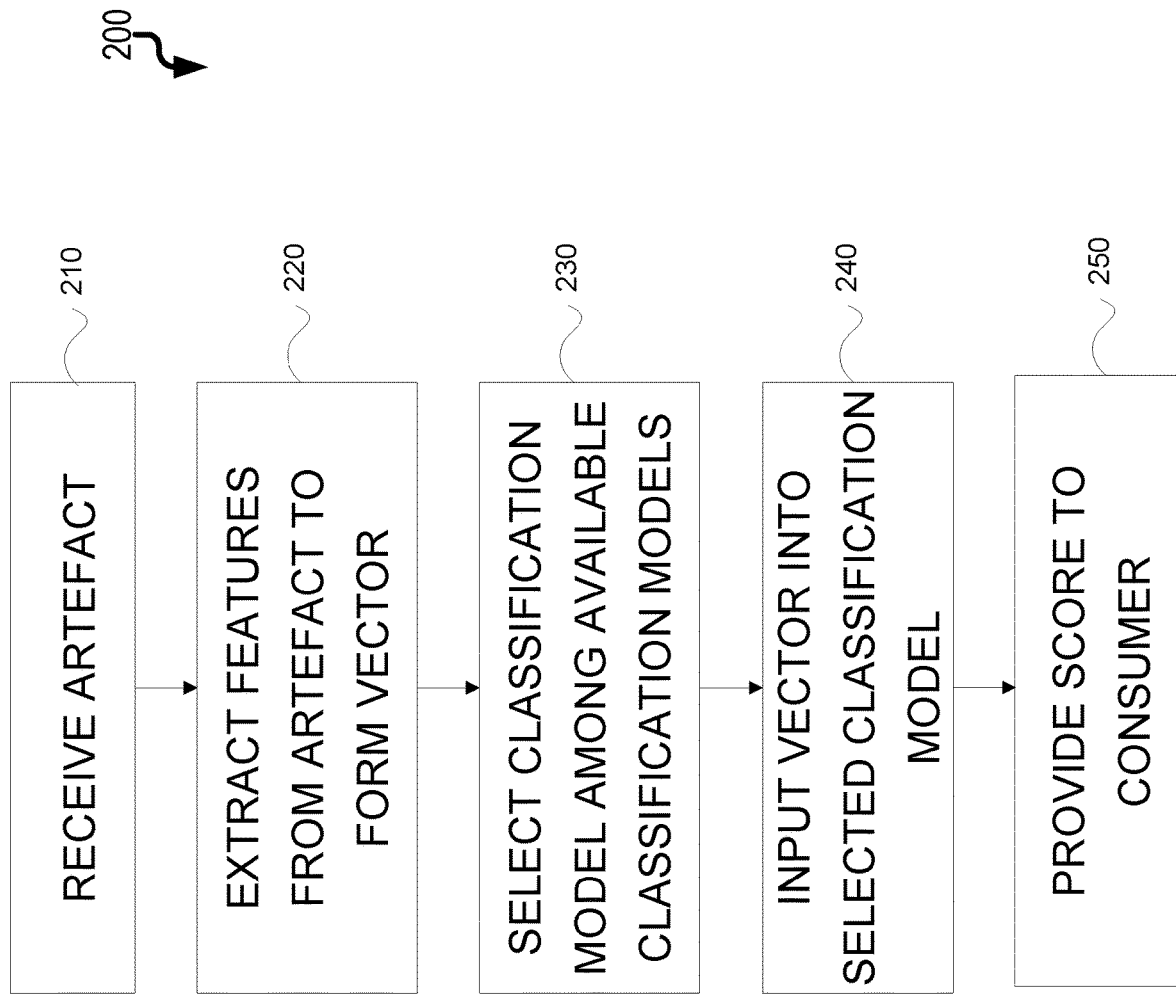
FIG. 2 is a process flow diagram illustrating a second computer-implemented workflow for obfuscating a classification of an artefact by using a plurality of classification models using different scoring paradigms.

FIG. 2 is a process flow diagram in which, at 210, an artefact is received. Thereafter, at 220, features are extracted from the artefact so that a vector can be populated with such features. Next, at 230, one of a plurality of classification models is selected (and all such classification models providing the same or substantially similar classifications). Next, at 240, the vector is input into the selected classification model to generate a score. Thereafter, the score is provided, at 250, to a consuming application or process which can, for example, take a subsequent action based on the score. For example, the consuming application or process can use such score to make a determination of whether or not to access, execute, or continue to execute the artefact (i.e., it can be used to prevent malware from infiltrating a computing and/or software system, etc.).

Figure 3:
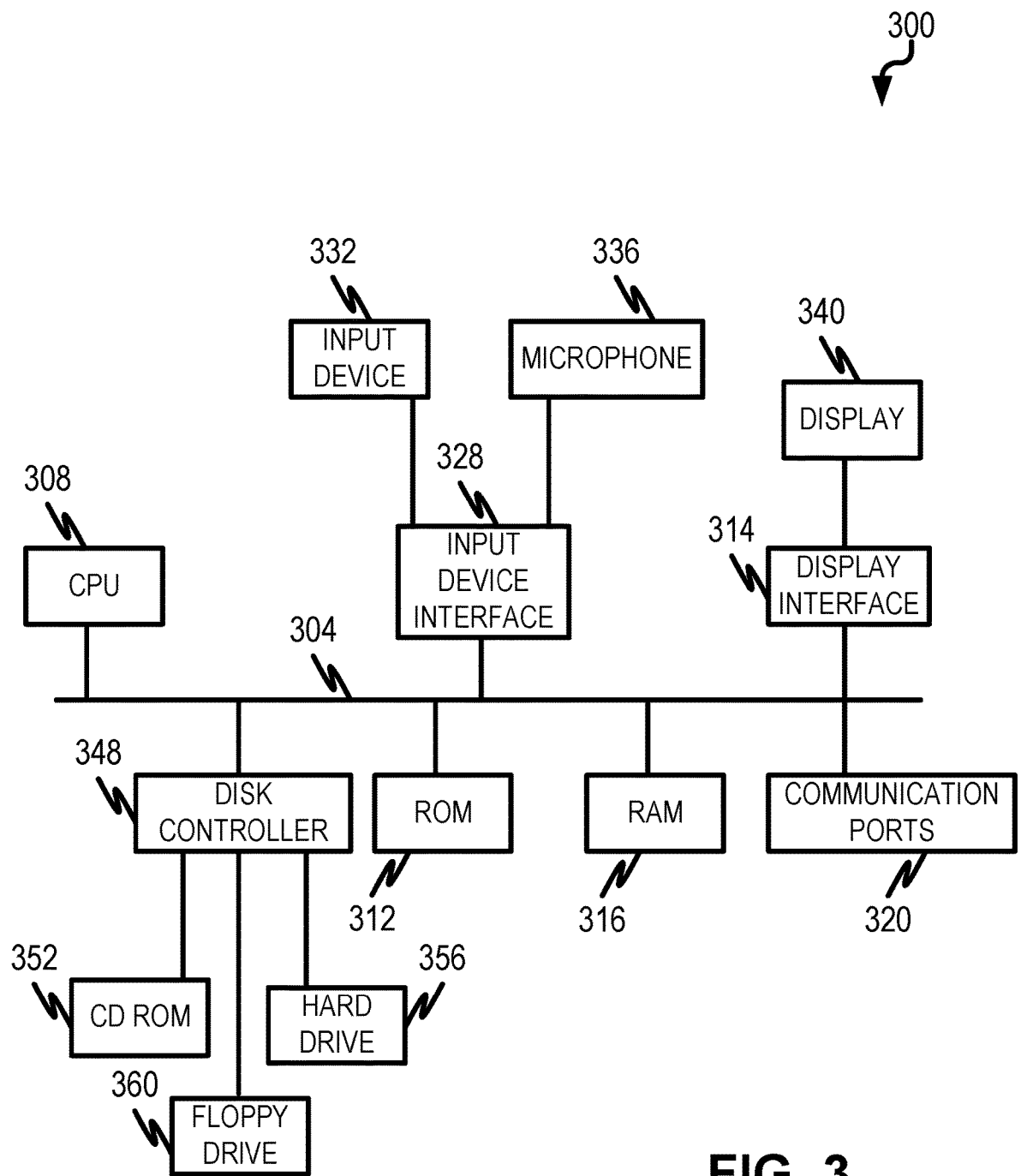
FIG. 3 is a diagram illustrating a computing device that can be used to implement aspects of the current subject matter.

FIG. 3 is a diagram 300 illustrating a sample computing device architecture for implementing various aspects described herein. A bus 304 can serve as the information highway interconnecting the other illustrated components of the hardware. A processing system 308 labeled CPU (central processing unit) (e.g., one or more computer processors/data processors at a given computer or at multiple computers/ processor cores, etc.), can perform calculations and logic operations required to execute a program. A non-transitory processor-readable storage medium, such as read only memory (ROM) 312 and random access memory (RAM) 316, can be in communication with the processing system 308 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 348 can interface with one or more optional disk drives to the system bus 304. These disk drives can be external or internal floppy disk drives such as 360, external or internal CD-ROM, CD-R, CD-RW or DVD, or solid state drives such as 352, or external or internal hard drives 356. As indicated previously, these various disk drives 352, 356, 360 and disk controllers are optional devices. The system bus 304 can also include at least one communication port 320 to allow for communication with external devices either physically connected to the computing system or available externally through a wired or wireless network. In some cases, the at least one communication port 630 includes or otherwise comprises a network interface.

To provide for interaction with a user, the subject matter described herein can be implemented on a computing device having a display device 630 (e.g., a CRT (cathode ray tube) or LCD (liquid crystal display) monitor) for displaying information obtained from the bus 304 via a display interface 314 to the user and an input device 332 such as keyboard and/or a pointing device (e.g., a mouse or a trackball) and/or a touchscreen by which the user can provide input to the computer. Other kinds of input devices 332 can be used to provide for interaction with a user as well; for example, feedback provided to the user can be any form of sensory feedback (e.g., visual feedback, auditory feedback by way of a microphone 336, or tactile feedback); and input from the user can be received in any form, including acoustic, speech, or tactile input. The input device 332 and the microphone 336 can be coupled to and convey information via the bus 304 by way of an input device interface 328. Other computing devices, such as dedicated servers, can omit one or more of the display 340 and display interface 314, the input device 332, the microphone 336, and input device interface 328.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for obfuscating machine learning model scores comprising:
   receiving each of a plurality of artefacts;
   extracting, for each artefact, features from the corresponding artefact and populating a respective vector;
   selecting, for each artefact, one of a plurality of available classification models using a selection algorithm, the classification models using different scoring paradigms while providing the same or substantially similar classifications;
   inputting, for each artefact, the respective vector into the selected classification model to generate a score; and
   providing, for each artefact, the generated score to a consuming application or process;
   wherein scores generated by the selected classification models obfuscate an effect of a changes to artefacts through false or misleading changes in the scores.

2. The method of claim 1, wherein the classification models characterize the artefact as being malicious or benign to access, execute, or continue to execute, and the method further comprises: preventing the artefact from being accessed, executing, or continuing to execute when the selected classification model characterizes the artefact as malicious.

3. The method of claim 1, wherein the selection algorithm is a random selection algorithm.

4. The method of claim 1, wherein the selection algorithm is a load balancing algorithm.

5. The method of claim 1, wherein the selection algorithm is a round robin selection algorithm.

6. The method of claim 1 further comprising reducing, for each artefact, features in the vector prior to the inputting into the selected classification model.

7. The method of claim 6, wherein the features are reduced using random projection matrices.

8. The method of claim 6, wherein the features are reduced using principal component analysis.

9. The method of claim 1, wherein the selected classification model is a machine learning model trained using a training data set and providing a continuous scale output.

10. The method of claim 9, wherein the machine learning model comprises one or more of: a logistic regression model, a neural network, a concurrent neural network, a recurrent neural network, a generative adversarial network, a support vector machine, a random forest, or a Bayesian model.

11. A system for obfuscating machine learning model scores comprising:
    at least one data processor; and
    memory storing instructions which, when executed by the at least one data processor, result in operations comprising:
    receiving an artefact;
    extracting features from the artefact and populating a vector;
    selecting one of a plurality of available classification models using a selection algorithm, the classification models using different scoring paradigms while providing the same or substantially similar classifications, the selecting causing scores generated by the selected classification model to obfuscate an effect of a change to the artefact through false or misleading changes in the scores;
    inputting the vector into the selected classification model to generate a score; and
    providing the generated score to a consuming application or process.

12. The system of claim 11, wherein the plurality of available classification models characterize the artefact as being malicious or benign to access, execute, or continue to execute, and the operations further comprise: preventing the artefact from being accessed, executing, or continuing to execute when the selected classification model characterizes the artefact as malicious.

13. The system of claim 11, wherein the selection algorithm is a random selection algorithm.

14. The system of claim 11, wherein the selection algorithm is a load balancing algorithm.

15. The system of claim 11, wherein the selection algorithm is a round robin selection algorithm.

16. The system of claim 11, wherein the operations further comprise: reducing, for each artefact, features in the vector prior to the inputting into the selected classification model.

17. The system of claim 16, wherein the features are reduced using random projection matrices.

18. The system of claim 16, wherein the features are reduced using principal component analysis.

19. The system of claim 11, wherein the selected classification model is a machine learning model trained using a training data set and providing a continuous scale output.

20. The system of claim 19, wherein the machine learning model comprises one or more of: a logistic regression model, a neural network, a concurrent neural network, a recurrent neural network, a generative adversarial network, a support vector machine, a random forest, or a Bayesian model.

* * * * *